June 21, 1938.   E. W. ERIKSON ET AL   2,121,123
FILTERING MEANS FOR LIQUID CONTAINERS
Filed June 8, 1936
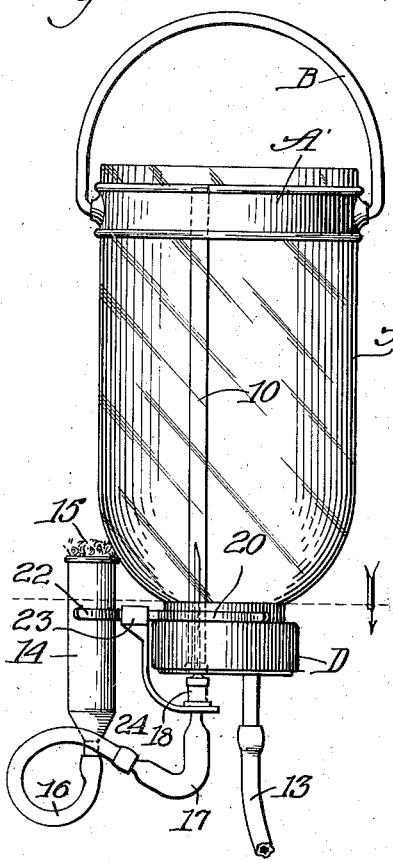
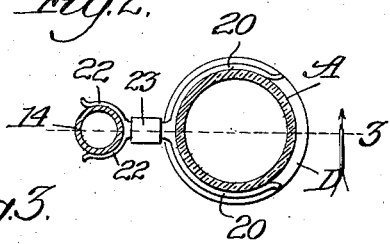
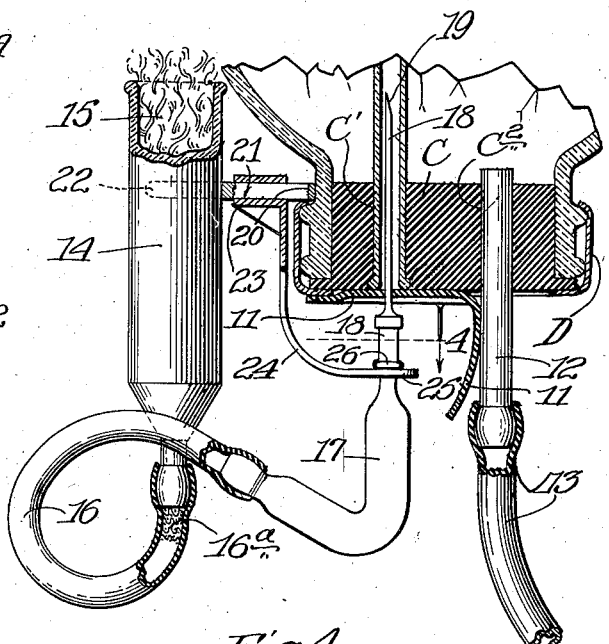
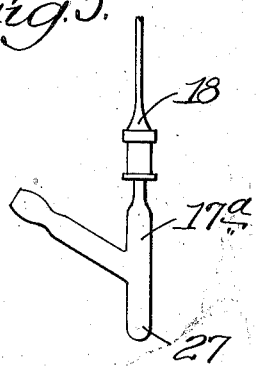
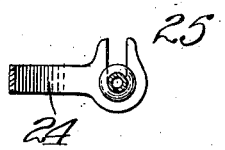
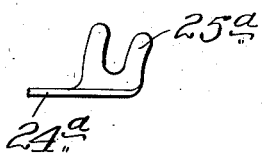
Inventors:
Eben W. Erikson
Naurice M. Nesset Patented June 21, 1938

2,121,123

UNITED STATES PATENT OFFICE 2,121,123

FILTERING MEANS FOR LIQUID CONTAINERS

Eben W. Erikson and Naurice M. Nesset, Glenview, Ill., assignors to Baxter Laboratories, Inc., a corporation of Delaware Application June 8, 1936, Serial No. 84,214

12 Claims. (Cl. 128—214)

This invention relates to filtering means for liquid containers and the like and is particularly useful in connection with the injection of intravenous solutions.

An object of the invention is to provide means whereby intravenous solutions can be readily released from a container while introducing filtered air into a portion of the container. Other specific objects and advantages will appear as the specification proceeds.

The invention is illustrated, in preferred embodiments, by the accompanying drawing in which—

Figure 1 is a broken side view in elevation of apparatus embodying our invention; Fig. 2 a transverse sectional view, the section being taken as indicated at line 2 of Fig. 1; Fig. 3, a broken enlarged sectional view, the section being taken as indicated at line 3 of Fig. 2; Fig. 4, a broken detailed sectional view, the section being taken as indicated at line 4 of Fig. 3; Fig. 5, a side view in elevation of a modified form of needle-tube; and Fig. 6, a view similar to Fig. 4 of a modified form of needle-supporting head.

In the illustration given, A designates a glass container equipped with a metal band A' and a bail B. The open end of the container A is closed by a rubber plug C having two passages C' and C² extending therethrough. A metal collar D secures the plug C within the neck of the container.

A glass tube 10 is received within the passage C' of plug C and has an open end reaching the remote side of the bottle. Prior to use, the passage C' and the passage C² are closed by a flexible rubber seal 11. When it is desired to use the container for intravenous injections etc., a portion of the rubber seal is rolled back as shown more clearly in Fig. 3 to uncover passage C². The glass connecting tube 12 is introduced into the passage C² and the tube 13 leads away to a hypodermic needle (not shown).

Heretofore, it has been common practice to remove the rubber disk or seal 11 entirely and to allow the unfiltered air to pass through tube 10 to the upper end of the container. The mass of unfiltered air in the top portion of the container contacts the liquid surface and tends to contaminate it. In order to overcome this difficulty, we have provided means for introducing filtered air while at the same time excluding unfiltered air. We are able to accomplish the exclusion of unfiltered air by utilizing the rubber seal 11 which is already present and which is essential for other purposes already described.

Our improved apparatus consists of a glass tube 14 containing cotton 15 or any other suitable filtering material, a flexible tube 16, and a bent glass tube 17 equipped at its inner end with a hollow needle 18. The hollow needle is provided with a beveled end 19 to permit it to be inserted readily through the rubber seal 11.

In order to support the tube 14 and needle 18 in the desired position, as shown in Fig. 3, we employ a split ring member 20 equipped with resilient fingers adapted to extend about the neck of the bottle as shown more clearly in Figs. 2 and 3. The member 20 is provided with a shank extension 21, the other end of which is bifurcated to form spring fingers 22 engaging tube 14. A sleeve 23 engages shank 21 and is provided with a depending arm 24 having at its end a slotted head 25, the slot being adapted to receive the upper portion of the glass tube in such a manner as to press inward on the lower flange of the needle proper, thus being independent of the type of needle used and insuring a good seal. As shown more clearly in Fig. 3, the head 25 abuts the lower flange 26 of needle 18.

In the operation of the apparatus, the filtering mechanism is preferably applied to the container A while it is in its normal position as a container and before it is inverted to the position shown in Figs. 1 and 3. The spring fingers 20 are caused to engage the neck of the container A while at the same time the spring fingers 22 are caused to engage the tube 14. The needle 18 is passed through the rubber seal 11 to the position shown in Fig. 3 and is then secured within the slotted head 25 of the supporting arm 24. In inserting the needle 18 through the seal 11, it is easy for the operator to find the proper point for inserting because the partial vacuum within container A normally draws the rubber disk 11 slightly into the mouth of tube 10. The depression thus formed makes it extremely easy for the operator to find the point for piercing the disk. The air entering the partial vacuum passes through the filtering material 15 to tube 16, angular tube 17 and needle 18. To permit the glass tube 12 to be inserted, a portion of the seal 11 is peeled away as shown more clearly in Fig. 3. This is done while the vessel is in its normal position as a container and before it is inverted to the position shown in Figs. 1 and 3. The liquid may then flow out through tube 12 and flexible tube 13 to the needle. As the liquid is removed, its volume is replaced by air which first passes through the filtering material 12 and the remainder of the parts into the glass tube 11.

During the removal of the liquid, the seal 11 is held by needle 18 and supporting arm 24 in tight relation with the mouth of tube 10 and thus excludes all unfiltered air. In this connection, the rubber disk which is essential for sealing the vacuum of the tube is utilized for the double function of excluding air from glass tube 10 after the vacuum is broken and while the liquid is being removed through glass tube 12.

The angularly formed member 17 tends to prevent entrainment of particles passing from the filtering material 15. In the modified construction shown in Fig. 5, the tube 17a is provided with a downwardly extending portion 27 having a closed end, thus providing a chamber for receiving entrained particles, providing also a well for receiving the fluid which normally flows from tube 10 when the vessel is inverted from its normal position as a container to the position shown in Figs. 1 and 3.

In the tube 16, we prefer to insert a metal screen 16a or other suitable strainer to prevent lint from the filter tube passing into the needle and from thence into the interior of the container.

In the modified form of the head shown in Fig. 6, it will be noted that the head 24a is provided with a curved slot which facilitates the engagement of the needle tube as well as the release of this member following the emptying of the container.

While in the foregoing discussion, we have described some of the parts as being made of glass, rubber etc., it will be understood that such description is merely of a preferred form and that other materials may be substituted therefor without departing from the scope of our invention.

The foregoing detailed description has been given for clearness of understanding only, and no unnecessary limitations should be understood therefrom, but the appended claims should be construed as broadly as permissible, in view of the prior art.

We claim:

1. In combination with a container having an open end closed by a plug, said plug being provided with an air inlet opening and a liquid outlet opening, a flexible seal extending over said openings, a hollow needle extending through said flexible seal and into said air inlet opening, and an air filter controlling the flow of air into said needle.

2. In combination with a container having an open end closed by a plug, said plug being provided with an air inlet opening and a liquid outlet opening, a flexible seal extending over said openings, a hollow needle extending through said flexible seal and into said air inlet opening, a tube connecting with said needle, and an air filter in said tube.

3. In combination with a container having an open end closed by a plug, said plug being provided with an air inlet opening and a liquid outlet opening, a flexible seal extending over said openings, a hollow needle extending through said flexible seal and into said air inlet opening, a tube connecting with said needle, and an air filter in said tube, means carried by said container for supporting said needle and tube.

4. In combination with a container having an open end closed by a plug, said plug being provided with an air inlet opening and a liquid outlet opening, a flexible seal extending over said openings, a hollow needle extending through said flexible seal and into said air inlet opening, a tube connecting with said needle, and an air filter in said tube, means carried by said container for supporting said needle and tube, said last mentioned means being releasably carried by said container.

5. In combination with a container having an open end closed by a plug, said plug being provided with an air inlet opening and a liquid outlet opening, a flexible seal extending over said openings, a hollow needle extending through said flexible seal and into said air inlet opening, a tube connecting with said needle, and an air filter in said tube, means carried by said container for supporting said needle and tube, said means including spring fingers releasably engaging said container.

6. In combination with a container having an open end closed by a plug, said plug being provided with an air inlet opening and a liquid outlet opening, a flexible seal extending over said openings, a hollow needle extending through said flexible seal and into said air inlet opening, a tube connecting with said needle, and an air filter in said tube, means carried by said container for supporting said needle and tube, said means including spring fingers engaging said container and spring fingers also engaging said tube.

7. In combination with a container having an open neck closed by a plug, said plug having an air inlet opening and a liquid opening, a resilient seal extending over said openings, a hollow needle extending through said seal into said air inlet opening, and a spring member releasably engaging said container neck and provided with a depending arm supporting said needle.

8. In combination with a container having an open neck closed by a plug said plug having an air inlet opening and a liquid outlet opening, a resilient sealing disk normally closing said openings, a filter-equipped tube, a hollow needle secured to said tube and extending through said seal into said air inlet opening, releasably clamping means engaging the neck of said bottle and having means also for supporting said tube, said clamping means being provided with a depending arm for supporting said needle and maintaining it against said flexible seal.

9. Air filtering apparatus adapted for use with an intravenous-solution container said container being provided with a plug and at least an air inlet opening therethrough, comprising: a hollow needle extending into said opening, means providing a seal about said opening and needle, a tube connecting with said needle, an enlarged filter casing connecting with said tube, filtering material in said casing, and releasable means for supporting said filter casing and said needle.

10. Air filtering apparatus adapted for use with an intravenous-solution container said container being provided with a plug and at least an air inlet opening therethrough, comprising: a hollow needle extending into said opening, means providing a seal about said needle and opening, a tube connected to said needle and providing angularly related passages, and an air filter connecting with said tube.

11. Air filtering apparatus adapted for use with an intravenous-solution container said container being provided with a plug and at least an air inlet opening therethrough, comprising: a hollow needle extending into said opening, means providing a seal about said needle and opening, means for supporting said needle within said opening, a tube secured to said needle and providing angularly disposed passages and an entrainment trap disposed adjacent the junction of said passages, and an air filter connecting with said tube.

12. In combination with a container having an open neck closed by a plug, said plug having an air inlet opening and a liquid opening, a resilient seal extending over said openings, a hollow needle extending through said seal into said air inlet opening, and a member releasably engaging said container neck and provided with a depending arm supporting said needle.

EBEN W. ERIKSON.
NAURICE M. NESSET.